United States Patent
Katsuki et al.

(10) Patent No.: US 9,830,011 B2
(45) Date of Patent: Nov. 28, 2017

(54) INPUT APPARATUS

(71) Applicant: FUJITSU LIMITED, Kawasaki-shi, Kanagawa (JP)

(72) Inventors: Takashi Katsuki, Isehara (JP); Fumihiko Nakazawa, Kawasaki (JP); Osamu Toyoda, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/259,316

(22) Filed: Sep. 8, 2016

(65) Prior Publication Data

US 2016/0378236 A1 Dec. 29, 2016

Related U.S. Application Data

(63) Continuation of application No. PCT/JP2014/058075, filed on Mar. 24, 2014.

(51) Int. Cl.
*G06F 3/045* (2006.01)
*G06F 3/041* (2006.01)
*G01L 1/16* (2006.01)
*G06F 3/044* (2006.01)

(52) U.S. Cl.
CPC .............. *G06F 3/0414* (2013.01); *G01L 1/16* (2013.01); *G06F 3/041* (2013.01); *G06F 3/0416* (2013.01); *G06F 3/044* (2013.01); *G06F 2203/04105* (2013.01)

(58) Field of Classification Search
CPC ........ G06F 3/044; G06F 3/0414; G06F 3/041; G06F 3/0416
USPC .................................................. 345/173, 174
See application file for complete search history.

(56) References Cited

U.S. PATENT DOCUMENTS

| | | |
|---|---|---|
| 2011/0227545 A1 | 9/2011 | Nakatsuka et al. |
| 2012/0144920 A1 | 6/2012 | Wong et al. |

FOREIGN PATENT DOCUMENTS

| | | |
|---|---|---|
| EP | 0 817 110 A2 | 1/1998 |
| JP | 10-97382 | 4/1998 |
| JP | 2011-59991 | 3/2011 |
| JP | 2012-125560 | 7/2012 |
| WO | WO 2010/150472 A1 | 12/2010 |

OTHER PUBLICATIONS

Patent Abstracts of Japan, Publication No. 2012-125560, published Jul. 5, 2012.

(Continued)

*Primary Examiner* — Calvin C Ma
(74) *Attorney, Agent, or Firm* — Staas & Halsey LLP

(57) ABSTRACT

An input apparatus includes a top panel having a manipulation input surface on which a manipulation input is performed; a pressure sensor having two terminals and configured to output a voltage in accordance with a pressure applied by the manipulation input on the manipulation input surface; a switch connected to the two terminals of the pressure sensor and configured to equalize electric potentials between the two terminals when the switch is turned on; and a controller configured to turn on the switch, after the pressure applied on the manipulation input surface is detected based on an output of the pressure sensor, when the manipulation input on the manipulation input surface is stopped or the output of the pressure sensor becomes equal to or less than a predetermined level that represents non-pressing.

8 Claims, 11 Drawing Sheets

(56) References Cited

OTHER PUBLICATIONS

Espacenet Bibliographic Data, Japanese Publication No. 10-97382, published Apr. 14, 1998.
Patent Abstracts of Japan, Publication No. 2011-59991, published Mar. 24, 2011.
International Search Report dated Apr. 28, 2014 in corresponding International Application No. PCT/JP2014/058075.

INPUT APPARATUS

CROSS-REFERENCE TO RELATED APPLICATION

This application is a continuation application of International Application PCT/JP2014/058075 filed on Mar. 24, 2014 and designated the U.S., the entire contents of which are incorporated herein by reference.

FIELD

The embodiment discussed herein relates to an input apparatus.

BACKGROUND

A conventional contact sensing display structure has a contact sensing element under a display. The contact sensing element is placed at a protected space. When the display is touched, its force is applied to a contact sensing film through the display. For example, an electro (electric) mechanical film (EMF) is preferably used as the contact sensing element in order to detect the contact, for example. A LCD display is used as the display, for example.

A more preferable method of measuring a change of charges in the EMF is to use a charge amplifier. In the charge amplifier, current between electrodes of the film is measured in a short circuit. An operation amplifier, resistors, and condensers constitute the charge amplifier connection. The resistors and the condensers are used for balancing the input impedances of the operation amplifier and they do not affect the transfer function of the connection. The resistor is used for limiting D.C. amplification (for example, see Patent document 1).

However, in the contact sensing display structure, when the user continues to push the display and leakage current flows into the contact sensing element, an output of the contact sensing element fluctuates. Accordingly, it may be impossible to accurately detect pressing by a manipulation input on the display.

[Related-Art Documents]

PATENT DOCUMENTS

[Patent Document 1] Japanese Laid-open Patent Publication No. H10-097382

SUMMARY

According to an aspect of the embodiments, an input apparatus includes a top panel having a manipulation input surface on which a manipulation input is performed; a pressure sensor having two terminals and configured to output a voltage in accordance with a pressure applied by the manipulation input on the manipulation input surface; a switch connected to the two terminals of the pressure sensor and configured to equalize electric potentials between the two terminals when the switch is turned on; and a controller configured to turn on the switch, after the pressure applied on the manipulation input surface is detected based on an output of the pressure sensor, when the manipulation input on the manipulation input surface is stopped or the output of the pressure sensor becomes equal to or less than a predetermined level that represents non-pressing.

DESCRIPTION OF EMBODIMENT

Hereinafter, an embodiment to which an input apparatus is applied will be described.

First Embodiment

Figure 1:
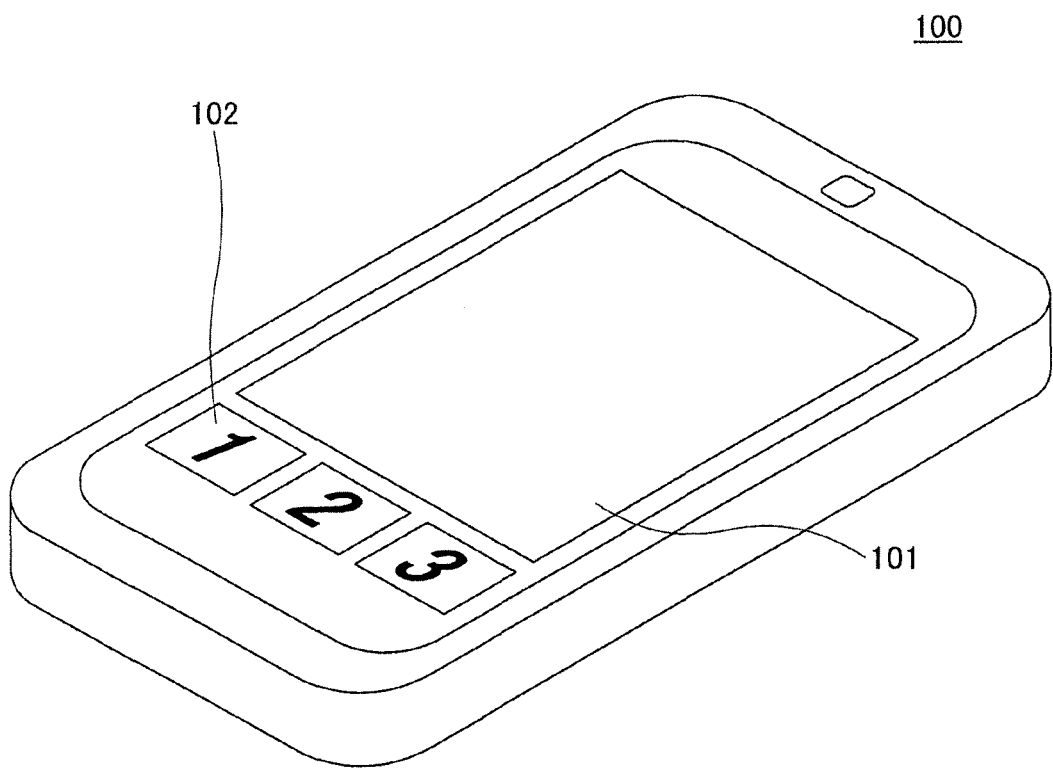
FIG. 1 is a perspective view illustrating an electronic device including an input apparatus according to a first embodiment.

FIG. 1 is a perspective view illustrating an electronic device 100 including an input apparatus according to a first embodiment.

The electronic device 100 is a smart phone terminal or a tablet computer, for example. The electronic device 100 may be any device as long as the device includes a touch panel as a manipulation input part. Accordingly, the electronic device 100 may be a device such as a handy type information terminal device, an Automatic Teller Machine (ATM) placed at a specific location, or the like, for example. In a case where the electronic device 100 is the personal computer, the touch panel may be overlapped with a display or may be provided as a touch pad in the vicinity of a keyboard.

In a manipulation input part 101 of the electronic device 100, a display panel is disposed under a touch panel, and an input part such as various buttons 102, an image, and the like are displayed on the display panel.

A user of the electronic device 100 touches the manipulation input part 101 in order to manipulate (operate) the GUI input part 102 with a fingertip under normal conditions.

Hereinafter, a detailed configuration of the electronic device 100 will be described with reference to FIG. 2.

Figure 2:
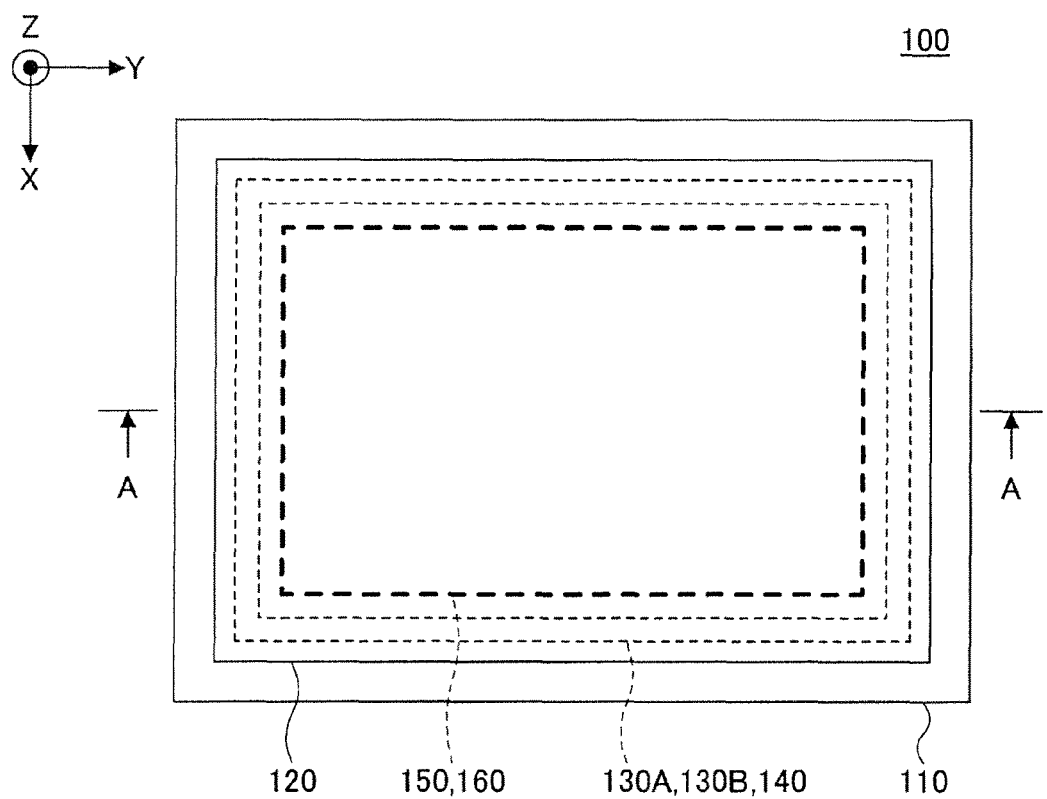
FIG. 2 is a diagram illustrating the electronic device including the input apparatus of the first embodiment in plan view.
Figure 3:
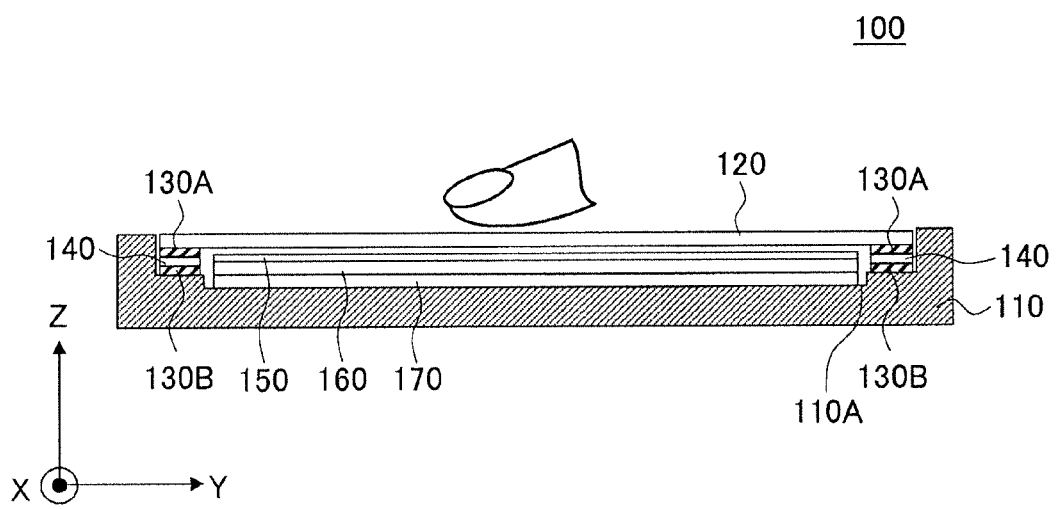
FIG. 3 is a diagram illustrating a cross-sectional view of the electronic device taken along a line A-A of FIG. 2.

FIG. 2 is a diagram illustrating the electronic device 100 including the input apparatus of the first embodiment in plan view. FIG. 3 is a diagram illustrating a cross-sectional view of the electronic device 100 taken along a line A-A of FIG.

2. An XYZ coordinate system as an orthogonal coordinate system is defined in FIGS. 2 and 3.

The electronic device 100 includes a housing 110, a top panel 120, double-faced adhesives tapes 130A and 130B, a pressure sensor 140, a touch panel 150, a display panel 160, and a substrate 170.

The housing 110 is made of a plastic, for example. As illustrated in FIG. 3, the substrate 170, the display panel 160 and the touch panel 150 are contained in a concave portion 110A of the housing 110, and the top panel 120 is bonded to the housing 110 by the double-faced adhesive tapes 130A and 130B. Here, the pressure sensor 140 is provided between the double-faced adhesive tapes 130A and 130B.

The top panel 120 is a plate-shaped member having a rectangular shape in plan view and is made of a transparent glass or a reinforced plastic such as polycarbonate. A surface of the top panel 120 which is located on a positive side in Z axis direction is one example of a manipulation input surface into which the user of the electronic device 100 performs a manipulation input.

Four sides in plan view of the top panel 120 are bonded to the housing by the double-faced adhesive tapes 130A and 130B. Here, the double-faced adhesive tapes 130A and 130B do not have to be a rectangular-ring-shape as illustrated in FIG. 3, as long as the double-faced adhesive tapes 130A and 130B can bond four sides of the top panel 120 to the housing 110.

The touch panel 150 is disposed on the negative side in Z axis direction of the top panel 120. The top panel 120 is provided in order to protect the surface of the touch panel 150. Another panel, protection film or the like may be provided on the surface of the top panel 120.

The pressure sensor 140 is a film type pressure sensor having a rectangular-ring-shape in plan view and outputs a voltage in accordance with pressing in a thickness direction (z axis direction). Similar to the double-faced adhesive tapes 130A and 130B, the shape in plan view of the pressure sensor 140 is a rectangular-ring-shape. The pressure sensor 140 is provided between the double-faced adhesive tapes 130A and 130B. This is to detect the pressing of the top panel 120 with the pressure sensor 140.

The pressure sensor 140 has a configuration where a pressure-sensitive material layer is sandwiched between a pair of electrodes disposed on an upper side in a thickness direction (positive side in z axis direction) and a lower side in the thickness direction (negative side in z axis direction). The details of the pressure sensor 140 will be described later with reference to FIG. 5. The pressure sensor 140 outputs, to between the pair of electrodes, a voltage in accordance with a pressure applied in the thickness direction.

The touch panel 150 is disposed on an upper side (positive side in Z axis direction) of the display panel 160 and is disposed on a lower side (negative side in Z axis direction) of the top panel 120. The touch panel 150 is one example of a coordinate detector that detects a position at which the user of the electronic device 100 touches the top panel 120. Hereinafter, the position that the user touches is referred to as a position of the manipulation input. The touch panel 150 outputs a coordinate signal representing the position of the manipulation input. When the touch panel 150 detects the position of the manipulation input, the touch panel 150 outputs the coordinate signal representing the position of the manipulation input. When the touch panel 150 does not detect the position of the manipulation input, the touch panel 150 does not output the coordinate signal.

The display panel 160 disposed under the touch panel 150 displays various GUI buttons or the like. Hereinafter, the various GUI buttons or the like are referred to as a GUI input part. Ordinarily, the user of the electronic device 100 touches the top panel 120 with a fingertip in order to manipulate (operate) the GUI input part.

The touch panel 150 is any coordinate detector as long as it can detect the position of the manipulation input on the top panel 120 performed by the user. The touch panel 150 may be a capacitance type coordinate detector or a resistance film type coordinate detector, for example. Hereinafter, the embodiment in which the touch panel 150 is the capacitance type coordinate detector will be described. In a case where the touch panel 150 is the capacitance type, the touch panel 150 can detect the manipulation input performed on the top panel 120 even if there is a clearance gap between the touch panel 150 and the top panel 120.

Although the top panel 120 is disposed on the manipulation input surface side of the touch panel 150 in the present embodiment, the top panel 120 may be integrated with the touch panel 150. In this case, the surface of the touch panel 150 is equal to the surface of the top panel 120 illustrated in FIGS. 2 and 3, and the surface of the touch panel 150 constitutes the manipulation input surface. Otherwise, the top panel 120 illustrated in FIGS. 2 and 3 may be omitted. In this case, the surface of the touch panel 150 constitutes the manipulation input surface.

In a case where the touch panel 150 is the capacitance type, the touch panel 150 may be disposed on the top panel 120. In this case, the surface of the touch panel 150 constitutes the manipulation input surface. Further, in a case where the touch panel 150 is the capacitance type, the top panel 120 as illustrated in FIGS. 2 and 3 may be omitted. In this case, the surface of the touch panel 150 constitutes the manipulation input surface.

The display panel 160 may be a display part that displays an image. The display panel 160 may be a liquid crystal display panel, an organic Electroluminescence (EL) panel or the like, for example. The display panel 160 is disposed in the concave portion 110A of the housing 110 and is disposed on (the positive side in Z axis direction of) the substrate 170 with a holder or the like.

The display panel 160 is driven and controlled by a driver Integrated Circuit (IC), which will be described later, and displays the GUI input part, the image, characters, symbols, graphics, or the like in accordance with an operating state of the electronic device 100.

The substrate 170 is disposed in the concave portion 110A of the housing 110. The display panel 160 and the touch panel 150 are disposed on the substrate 170. The display panel 160 and the touch panel 150 are fixed to the substrate 170 and the housing 110 by a holder or the like (not shown).

For example, the substrate 170 may be a printed substrate of Flame Retardant type 4 (FR-4) standards and may include a plurality of insulation layers and a plurality of wiring layers. On the substrate 170, various circuits or the like that are necessary for driving the electronic device 100 are mounted.

Here, a two-step manipulation is required to confirm a manipulation in the input apparatus of the embodiment. In a first step, the user performs a manipulation input on the top panel 120 to select a desired GUI input part. In a second step, the user further presses the top panel 120 to confirm the manipulation.

The input apparatus of the embodiment uses the pressure sensor 140 in order to detect the confirmation of the manipulation at the second step. The manipulation is confirmed when a voltage value that the pressure sensor 140 outputs becomes equal to or greater than a predetermined threshold.

Figure 4:
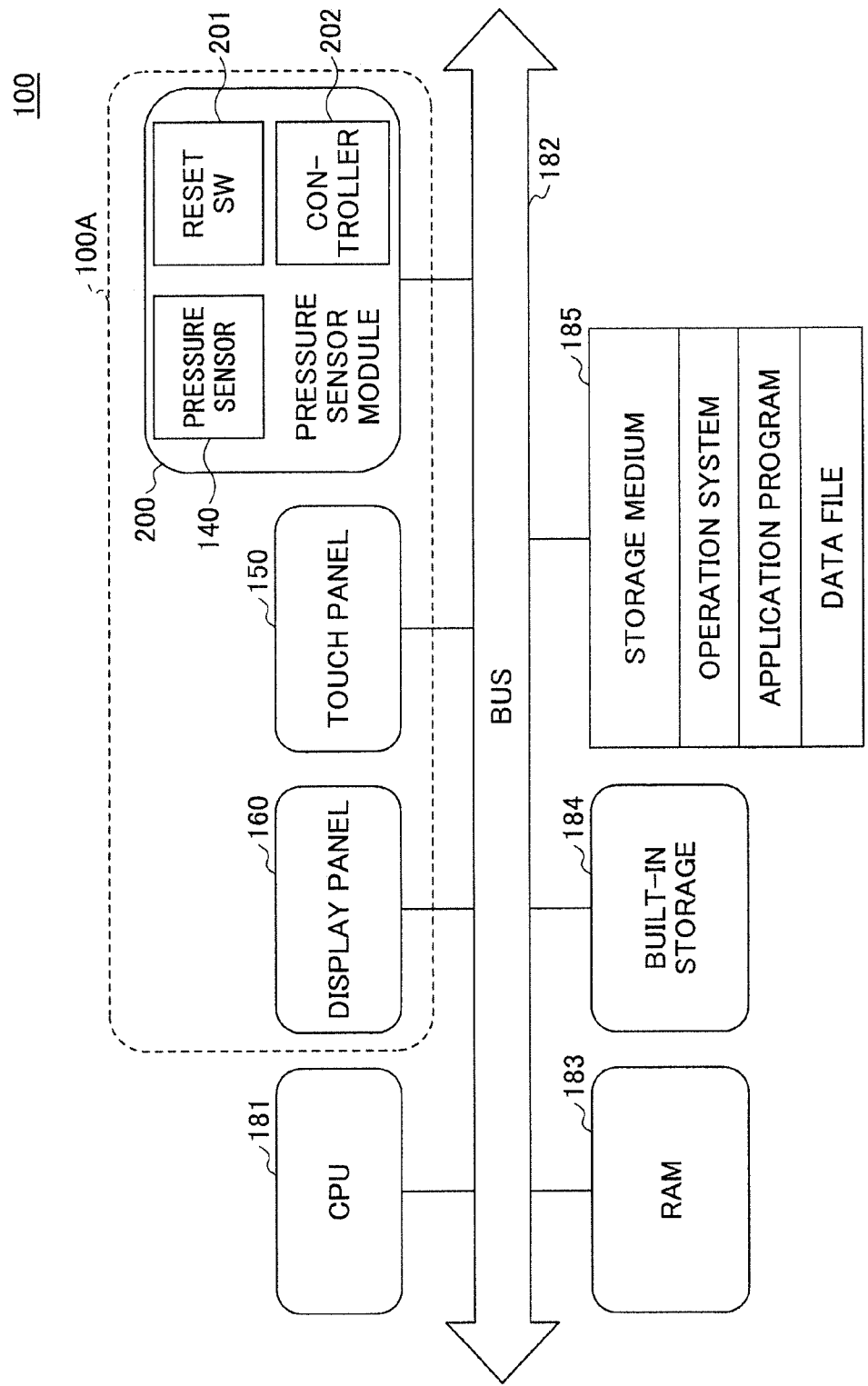
FIG. 4 is a block diagram illustrating a configuration of the electronic device including the input apparatus of the embodiment.

FIG. 4 is a block diagram illustrating a configuration of the electronic device 100 including the input apparatus 100A of the embodiment.

The electronic device 100 includes the touch panel 150, the display panel 160, a Central Processing Unit (CPU) 181, a bus 182, a Random Access Memory (RAM) 183, a built-in storage 184, a storage medium 185, and a pressure sensor module 200. Here, the touch panel 150, the display panel 160, and the pressure sensor 140 included in the pressure sensor module 200 are similar to those illustrated in FIGS. 2 and 3.

Among the configuration elements illustrated in FIG. 4, the touch panel 150, the display panel 160, and the pressure sensor module 200 constitute the input apparatus 100A of the embodiment.

The CPU 181 is an arithmetic processing unit that performs processing in accordance with the operation of the electronic device 100. The touch panel 150, the display panel 160, the RAM 183, the built-in storage 184, the storage medium 185, and the pressure sensor module 200 are connected to the CPU 181 via the bus 182.

The RAM 183 is a main memory of the CPU 181. Programs that the CPU 181 executes are loaded on the RAM 183, for example. The built-in storage 184 is a memory that stores programs or data necessary for the operation of the electronic device 100. The storage medium 185 is a memory that stores data files, application programs, an operation system (OS), and the like necessary for the operation of the electronic device 100. Here, the built-in storage 184 is a rewritable storage medium.

The pressure sensor module 200 includes the pressure sensor 140, a reset switch 201, and a controller 202. The reset switch 201 is a switch that resets an output of the pressure sensor module 200, and is driven by the controller 202.

Figure 5:
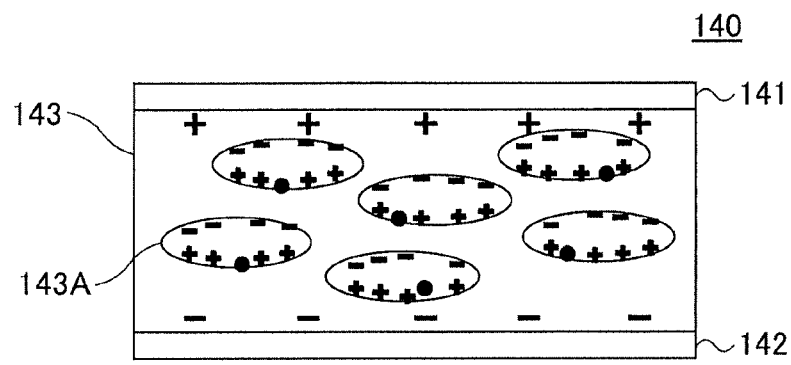
FIG. 5 is a diagram illustrating a cross-sectional structure of a pressure sensor.

FIG. 5 is a diagram illustrating a cross-sectional structure of the pressure sensor 140.

As illustrated in FIG. 5, the pressure sensor 140 includes a pair of electrodes 141 and 142 and a pressure-sensitive material layer 143. For example, the electrodes 141 and 142 may be Indium Tin Oxide (ITO). As illustrated in FIG. 2, the electrodes 141 and 142 may be formed to have a rectangular-ring-shape in plan view in order to surround the top panel 150 and the display panel 160.

Further, the electrodes 141 and 142 are connected to the reset switch 201 and the controller 202 (see FIG. 4) via the substrate 170 illustrated in FIG. 3, wires of another internal substrate, which is not the substrate 170, of the pressure sensor module 200, or the like.

The pressure-sensitive material layer 143 includes electret materials 143A. When the pressure-sensitive material layer 143 is pressed in a thickness direction, charges are generated as illustrated in FIG. 5 and the voltage is generated between the pair of electrodes 141 and 142. The voltage that the pressure-sensitive material layer 143 generates changes in accordance with the pressure applied in the thickness direction. The voltage, which the pressure-sensitive material layer 143 generates, is 0 V in a case where the pressure is zero. The voltage, which the pressure-sensitive material layer 143 generates, increases in accordance with an increase of the pressure.

Such a pressure sensor 140 is provided between the double-faced adhesive tapes 130A and 130B (see FIG. 3) to detect the pressing on the top panel 120.

Figure 6:
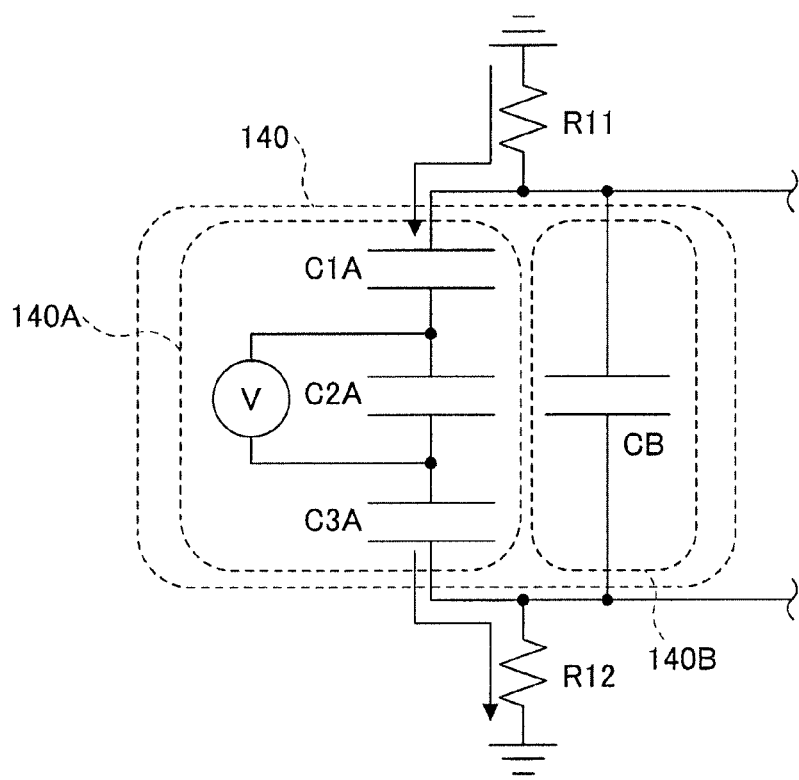
FIG. 6 is a diagram illustrating an equivalent circuit of the pressure sensor.

FIG. 6 is a diagram illustrating an equivalent circuit of the pressure sensor 140.

Because the voltage, which the pressure-sensitive material layer 143 generates, increases in accordance with the increase of the pressure and is 0 V in a case where the pressure is zero, a pressing area 140A and a non-pressing area 140B of the pressure sensor 140 are separately described in the equivalent circuit of the pressure sensor 140 illustrated in FIG. 6.

In the non-pressing area 140B, the pressure sensor 140 is expressed by one capacitor CB. A portion corresponding to the non-pressing area 140B of the pressure sensor 140 is equivalent to one capacitor because the pair of electrodes 141 and 142 (see FIG. 5) face each other to constitute the capacitor.

In the pressing area 140A, it is equivalent to presence of three capacitors C1A, C2A, and C3A because electromotive force is generated in the electret materials 143A of the pressure-sensitive material layer 143. Here, a power generating function of the electret materials 143A is expressed by a power source V connected in parallel to the capacitor C2A. An electrode at an upper side of the capacitor C1A corresponds to the electrode 141 (see FIG. 5). An electrode at a lower side of the capacitor C3A corresponds to the electrode 142 (see FIG. 5). The pressure-sensitive material layer 143 corresponds to an electrode at a lower side of the capacitor C1A, the capacitor C2A, and an electrode at an upper side of the capacitor C3A.

Here, resistors R11 and R12 illustrated above and below the pressure sensor 140 are insulation resistance of a substrate inside of the pressure sensor module 200, the substrate 170 (see FIG. 3), or the like. The insulation resistance is expressed by using a symbol of the resistor. The insulation resistance is a resistance of an insulation layer between a plurality of wiring layers of the substrate inside of the pressure sensor module 200, the substrate 170, or the like. Although the resistance of the insulation layer may be of a giga-ohm (GΩ) order, for example, a minute current flows. Thus, as illustrated by arrows, a leakage current flows to the electrode (electrode 141) at the upper side of the capacitor C1A of the pressure sensor 140 and the electrode (electrode 142) at the lower side of the capacitor C3A via the insulation layer.

Thus, when the user continues to push the top panel 120, charges generated in the electrode (electrode 142) at the lower side of the capacitor C3A and in the electrode (electrode 141) at the upper side of the capacitor C1A of the pressure sensor 140 are cancelled by the electromotive force of the electret materials 143A. Accordingly, it may be impossible to accurately detect pressing on the top panel 120 with the pressure sensor 140.

Because the electret materials 143A of the pressure-sensitive material layer 143A have a large piezoelectric stress constant (g constant) and generate a high voltage even when being pressed by a low pressure, the electret materials 143A are suitable for sensitive detection. However, because a piezoelectric distortion constant (d constant) is not large and a generated charge amount is not large for the high generated voltage, the generated charges are easily cancelled by a leakage current of a detection circuit when the pressed state continues.

Accordingly, for example, when the user continues to push the top panel 120 over several seconds, it may be impossible to accurately detect the pressing on the top panel 120 with the pressure sensor 140.

Thus, the input apparatus 100A of the embodiment uses the reset switch 201 to accurately detect the pressing on the top panel 120 with the pressure sensor 140.

Figure 7:
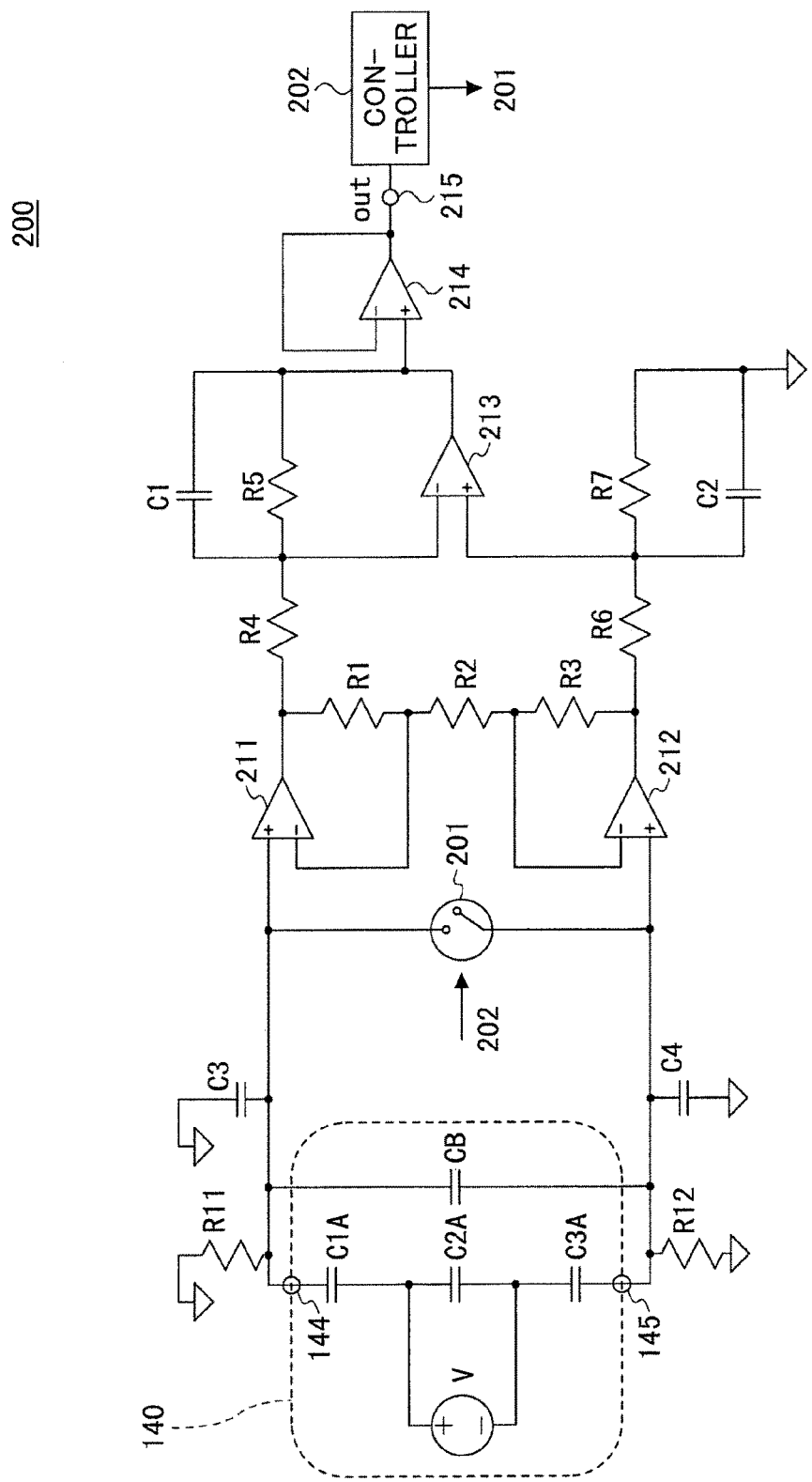
FIG. 7 is a diagram illustrating a circuit configuration of a pressure sensor module.

FIG. 7 is a diagram illustrating a circuit configuration of the pressure sensor module 200.

The pressure sensor module 200 includes the pressure sensor 140, the reset switch 201, the controller 202, operational amplifiers 211, 212, 213, and 214, resistors R1, R2, R3, R4, R5, R6, and R7, and capacitors C1, C2, C3, and C4.

FIG. 7 illustrates a pair of terminals 144 and 145 of the pressure sensor 140. Further, FIG. 7 illustrates the resistors R11 and R12 as the above described insulation resistance.

The reset switch 201 is connected between the pair of terminals 144 and 145 of the pressure sensor 140. For example, the reset switch 201 may be a transistor or a switch realized by Micro Electro Mechanical Systems (MEMS), and on-off control is performed by the controller 202. The reset switch 201 is an example of a switch.

When the manipulation input on the touch panel 150 is stopped after pressing of the top panel 120 is detected by the pressure sensor 140, the reset switch 201 is turned on for a predetermined time period. Except for the predetermined time period, the reset switch 201 is turned off basically.

A noninverting input terminal of the operational amplifier 211 is connected to the terminal 144 of the pressure sensor 140. An inverting input terminal of the operational amplifier 211 is connected to the output terminal of the operational amplifier 211 via the resistor R1. The operational amplifier 211 amplifies an output of the terminal 144 of the pressure sensor 140 to output the amplified output.

A noninverting input terminal of the operational amplifier 212 is connected to the terminal 145 of the pressure sensor 140. An inverting input terminal of the operational amplifier 212 is connected to the output terminal of the operational amplifier 212 via the resistor R3. The operational amplifier 212 amplifies an output of the terminal 145 of the pressure sensor 140 to output the amplified output. Here, amplification factors of the operational amplifiers 211 and 212 are set by the resistors R1, R2, and R3.

An inverting input terminal of the operational amplifier 213 is connected to the output terminal of the operational amplifier 211 via the resistor R4. A noninverting input terminal of the operational amplifier 213 is connected to the output terminal of the operational amplifier 212 via the resistor R6. Further, a parallel circuit of the resistor R5 and the capacitor C1 is connected between the output terminal and the inverting input terminal of the operational amplifier 213. Further, a parallel circuit of the resistor R7 and the capacitor C2 is connected between the noninverting input terminal of the operational amplifier 213 and a ground potential point of the resistor R6. Here, the amplification factor of the operational amplifier 213 is set by a ratio of the resistors R4 and R5. The ratio of the resistors R4 and R5 is equal to a ratio of the resistors R6 and R7.

A noninverting input terminal of the operational amplifier 214 is connected to the output terminal of the operational amplifier 213. An inverting input terminal of the operational amplifier 214 is connected to the output terminal of the operational amplifier 214 in a negative feedback manner. Further, the output terminal of the operational amplifier 214 is connected to the terminal 215 that amplifies the output of the pressure sensor 140 to output the amplified output. The terminal 215 is connected to the controller 202.

The capacitors C3 and C4 are connected between the pressure sensor 140 and the reset switch 201. More specifically, one terminal of the capacitor C3 is connected between the terminal 144 of the pressure sensor 140 and an upper side terminal of the reset switch 201, and the other terminal of the capacitor C3 is grounded. One terminal of the capacitor C4 is connected between the terminal 145 of the pressure sensor 140 and a lower side terminal of the reset switch 201, and the other terminal of the capacitor C4 is grounded.

In the pressure sensor module 200 having the above described circuit configuration, the controller 202 determines presence/absence of the pressing on the top panel 120 based on a voltage output from the terminal 215. The controller 202 sets a predetermined threshold when determining presence/absence of the pressing and detects that the pressing is performed when the output voltage of the terminal 215 is equal to or greater than the predetermined threshold.

Figure 8:
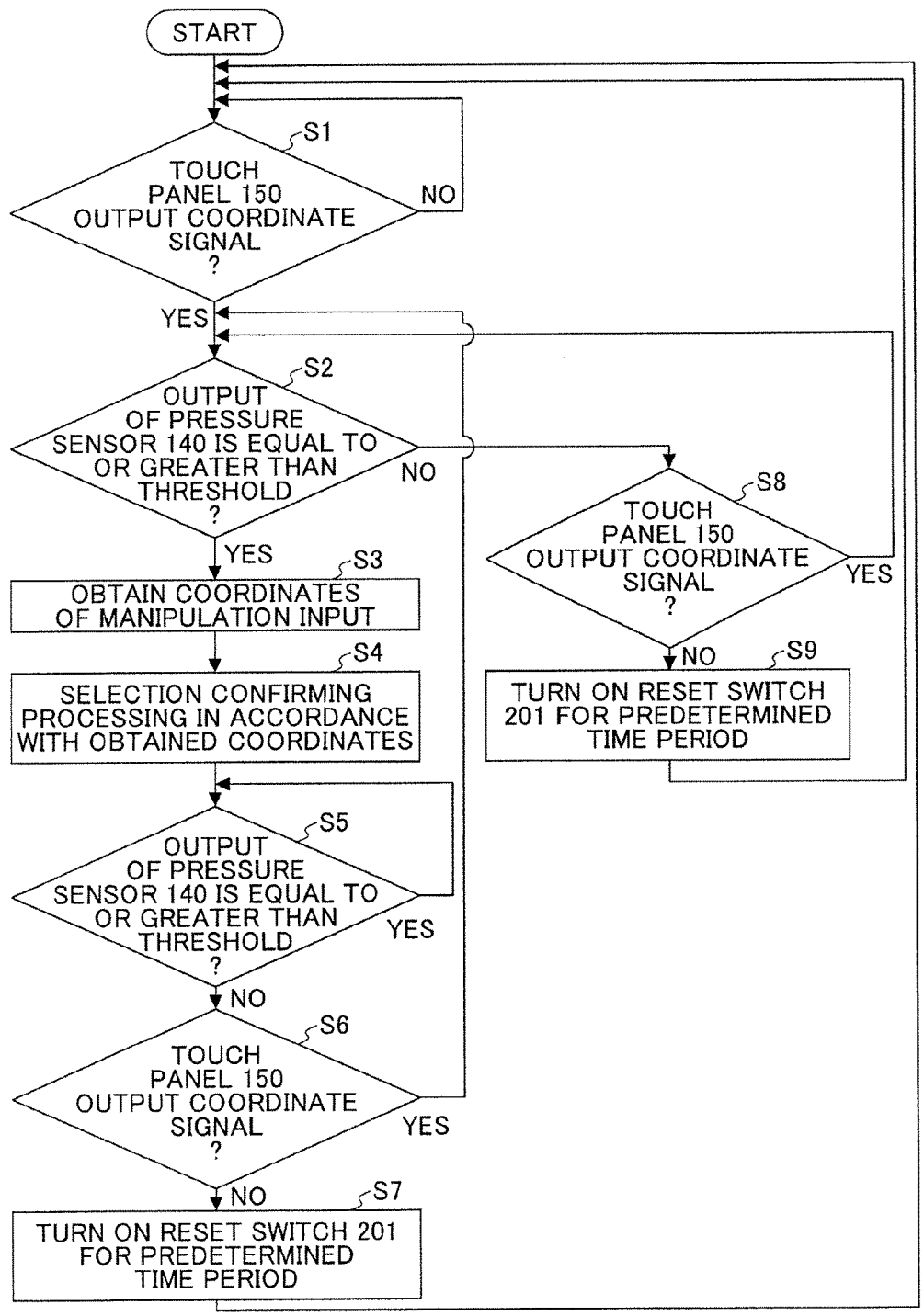
FIG. 8 is a flowchart illustrating processing when a controller of the input apparatus of the embodiment performs on/off control of a reset switch.

FIG. 8 is a flowchart illustrating processing when the controller 202 of the input apparatus 100A of the embodiment performs on/off control of the reset switch 201.

The controller 202 starts the processing when power is applied to the electronic device 100 (START).

The controller 202 determines whether the touch panel 150 outputs a coordinate signal (step S1). This is to determine whether a manipulation input is performed on the top panel 120 by the user. Here, the controller 202 repeatedly executes the processing at step S1 until the coordinate signal is output.

When the controller 202 has determined that the touch panel 150 outputs the coordinate signal (YES at step S1), the controller 202 determines whether an output voltage of the pressure sensor 140 is equal to or greater than a threshold (step S2). This is to determine whether the user presses the top panel 120 to confirm the manipulation. Here, the output voltage of the terminal 215 obtained by amplifying the output voltage of the pressure sensor 140 is compared with the threshold.

When the controller 202 has determined that the output voltage of the pressure sensor 140 is equal to or greater than the threshold (YES at step S2), the controller 202 obtains coordinates where the manipulation input is performed from the coordinate signal that the touch panel 150 outputs (step S3).

Next, the controller 202 performs selection confirming processing in accordance with the obtained coordinates (step S4). Because one of GUI input parts displayed on the display panel 160 of the electronic device 100 is selected and the top panel 120 is pressed to confirm the selection, the processing according to the manipulation on the GUI input part where the selection is confirmed is performed. As a result, the controller 202 notifies the CPU 181 (see FIG. 4) of the result of the selection confirming processing. The CPU 181 executes processing corresponding to the manipulation performed on the GUI input part where the selection is confirmed.

Next, the controller 202 determines whether the output of the pressure sensor 140 is equal to or greater than the threshold (step S5). This is to determine presence/absence of the pressing. Here, the controller 202 repeatedly executes the processing at step S5 until the output of the pressure sensor 140 becomes equal to or less than the threshold.

When the controller 202 has determined that the output of the pressure sensor 140 is not equal to or greater than the threshold (NO at step S5), the controller 202 determines whether the touch panel 150 outputs the coordinate signal (step S6). This is to determine whether the user continues to perform the manipulation input on the top panel 120.

When the controller 202 has determined that the touch panel 150 does not output the coordinate signal (NO at step S6), the controller 202 turns on the reset switch 201 for a predetermined time period (step S7). When the reset switch 201 is turned on, the electric potentials of the terminals 144 and 145 of the pressure sensor 140 become equal to each other. Thereby, the output voltage of the terminal 215 becomes 0 V. Thus, this is to reset the output voltage of the terminal 215 to 0 V.

A reason why the reset switch 201 is turned on for the predetermined time period in a case where it is determined that the touch panel 150 does not output the coordinate signal (NO at step S6) is described in the following. That is, there is a case where the user's fingertip lightly touches the top panel 120 even in a case where it is determined that the output of the pressure sensor 140 is not equal to or greater than the threshold (NO at step S5). Thus, thus the reset switch 201 is turned on for the predetermined time period in a case where it is determined that the output of the pressure sensor 140 is not equal to or greater than the threshold (NO at step S5) and it is determined that the touch panel 150 does not output the coordinate signal (NO at step S6).

Here, when the processing at step S7 ends, the controller 202 returns the flow to step S1.

Further, when the controller 202 has determined that the touch panel 150 does not output the coordinate signal (NO at step S2), the flow proceeds to step S8.

The controller 202 determines whether the touch panel 150 outputs the coordinate signal (step S8). This is to determine whether the user continues to perform the manipulation input on the top panel 120.

When the controller 202 has determined that the touch panel 150 does not output the coordinate signal (NO at step S8), the controller 202 turns on the reset switch 201 for the predetermined time period (step S9). This is to reset the output voltage of the terminal 215 to 0 V in preparation for a next manipulation input even when the manipulation is not confirmed.

Here, when the controller 202 has determined that the touch panel 150 outputs the coordinate signal (YES at step S6), the flow returns to step S2. This is to determine whether the user presses the top panel 120 to confirm the manipulation.

Further, when the controller 202 has determined that the touch panel 150 outputs the coordinate signal (YES at step S8), the flow returns to step S2. This is to determine whether the user presses the top panel 120 to confirm the manipulation.

The above described processing is repeatedly executed until the power of the electronic device 100 is turned off.

Next, a simulation result of the voltage output from the terminal 215 is described with reference to FIG. 9.

Figure 9:
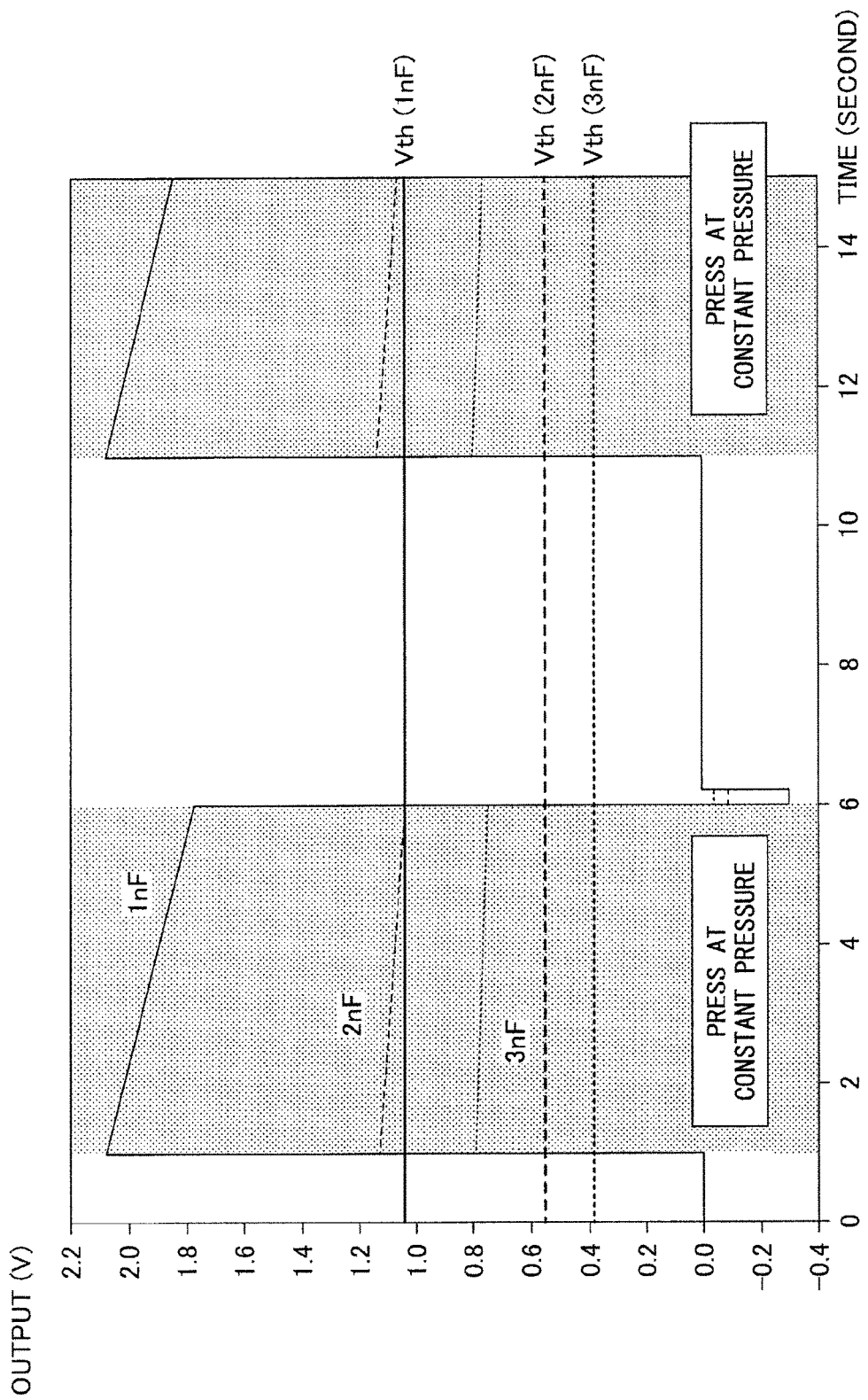
FIG. 9 is a diagram illustrating a simulation result of a voltage output from a terminal of the pressure sensor module.

FIG. 9 is a diagram illustrating the simulation result of the voltage output from the terminal 215 of the pressure sensor module 200. Here, the simulation is performed under three conditions where both electrostatic capacitance of the capacitor C3 and electrostatic capacitance of the capacitor C4 are 1 nF, 2 nF, or 3 nF. Further, resistance values of the resistors R11 and R12 as the insulation resistances are set to 30 GΩ.

In FIG. 9, a horizontal axis represents an elapsed time from the start of the simulation. The top panel 120 is pressed at a constant pressure over 5 seconds from a time point, at which the elapsed time is 1 second, to a time point, at which the elapsed time is 6 seconds. Then, the manipulation input on the top panel 120 is stopped at the time point, at which the elapsed time is 6 seconds, and the top panel 120 is again pressed at the constant pressure at a time point where the elapsed time is 11 seconds.

Further, a vertical axis in FIG. 9 represents a voltage output from the terminal 215 of the pressure sensor module 200. In a case where both the electrostatic capacitance of the capacitor C3 and the electrostatic capacitance of the capacitor C4 are 1 nF, 2 nF, or 3 nF, the controller 202 respectively uses a predetermined threshold Vth (1 nF), Vth (2 nF), or Vth (3 nF) to detect pressing of when the output voltage of the terminal 215 is equal to or greater than the predetermined threshold.

In FIG. 9, when the manipulation input on the touch panel 150 is stopped at the time point, at which the elapsed time is 6 seconds, after the pressing of the top panel 120 is detected by the pressure sensor 140, the controller 202 turns on the reset switch 201 for the predetermined time period.

Here, for example, the predetermined time period where the reset switch 201 is turned on is set to be 1 microsecond as a time sufficient for equalization of electric potentials of the electrode (electrode 142) at the lower side of the capacitor C3A and the electrode (electrode 141) at the upper side of the capacitor C1A of the pressure sensor 140.

When the top panel 120 is pressed at the constant pressure from the time point, at which the elapsed time is 1 second, the output voltage of the terminal 215 increases. This is because the electromotive force is generated in the pressure-sensitive material layer 143 when the top panel 120 is pressed.

When the top panel 120 is pressed at the constant pressure over 5 seconds from the time point, at which the elapsed time is 1 second, to the time point, at which the elapsed time is 6 seconds, the output voltage of the terminal 215 gradually decreases in every case. This is because a leakage current flows into the resistors R11 and R12 as the insulation resistances. Such a tendency is similarly obtained in any case where both electrostatic capacitance of the capacitor C3 and electrostatic capacitance of the capacitor C4 are 1 nF, 2 nF, or 3 nF.

When the manipulation input is stopped when the elapsed time is 6 seconds, the output voltage of the terminal 215 exponentially decreases. However, when the reset switch 201 is turned on immediately after that, the output voltage of the terminal 215 becomes 0 V.

This is because the output voltage of the terminal 215 becomes 0 V when the electric potentials of the terminals 144 and 145 of the pressure sensor 140 are equalized by turning on the reset switch 201. That is, the output voltage of the terminal 215 is reset to be 0 V.

After that, when the top panel 120 is again pressed at the constant pressure at the time point, at which the elapsed time is 11 seconds, the output voltage of the terminal 215 increases similar to the case where the top panel 120 is pressed at the time point, at which the elapsed time is 1 second.

When the top panel 120 is pressed at the constant pressure from the time point, at which the elapsed time is 11 seconds, the output voltage of the terminal 215 gradually decreases in every case. This is because the leakage current flows into the resistors R11 and R12 as the insulation resistances. Such a tendency is similarly obtained in any case where both the electrostatic capacitance of the capacitor C3 and the electrostatic capacitance of the capacitor C4 are 1 nF, 2 nF, or 3 nF.

As described above, according to the input apparatus 100A of the embodiment, the controller 202 turns on the reset switch 201 for the predetermined time period when the touch panel 150 detects that the manipulation input is stopped after the top panel 120 is pressed. In this way, the output voltage of the terminal 215 is reset to be 0 V.

Thus, when the top panel 120 is pressed for the second time, electric charges are generated in the terminals 144 and 145 by the electromotive force of the pressure-sensitive material layer 143 and the output voltage of the terminal 215 increases similarly to the pressing for the first time. Accordingly, similar to the first time the top panel 120 is pressed, it becomes possible to correctly detect the pressing of the top panel 120 when the top panel 120 is pressed for the second time. Similarly, it becomes possible to correctly detect pressing of the top panel 120 when the top panel 120 is pressed for the third or more time.

Here, if the reset switch 201 is not turned on when the manipulation is stopped after the top panel 120 is pressed, the output voltage of the terminal 215 becomes a negative voltage without being reset to 0 V. Thus, if a state occurs where the output voltage of the terminal 215 does not exceed the threshold when the pressing is performed for the second time, it becomes impossible to correctly detect the pressing of the top panel 120.

On the contrary, because the input apparatus 100A of the embodiment turns on the reset switch 201 for the predetermined time period when the manipulation input is stopped after the top panel 120 is pressed, the output voltage of the terminal 215 is reset to be 0 V. Accordingly, it becomes possible to correctly detect the pressing of the top panel 120.

Here, a comparative input apparatus is described with reference to FIGS. 10 and 11.

Figure 10:
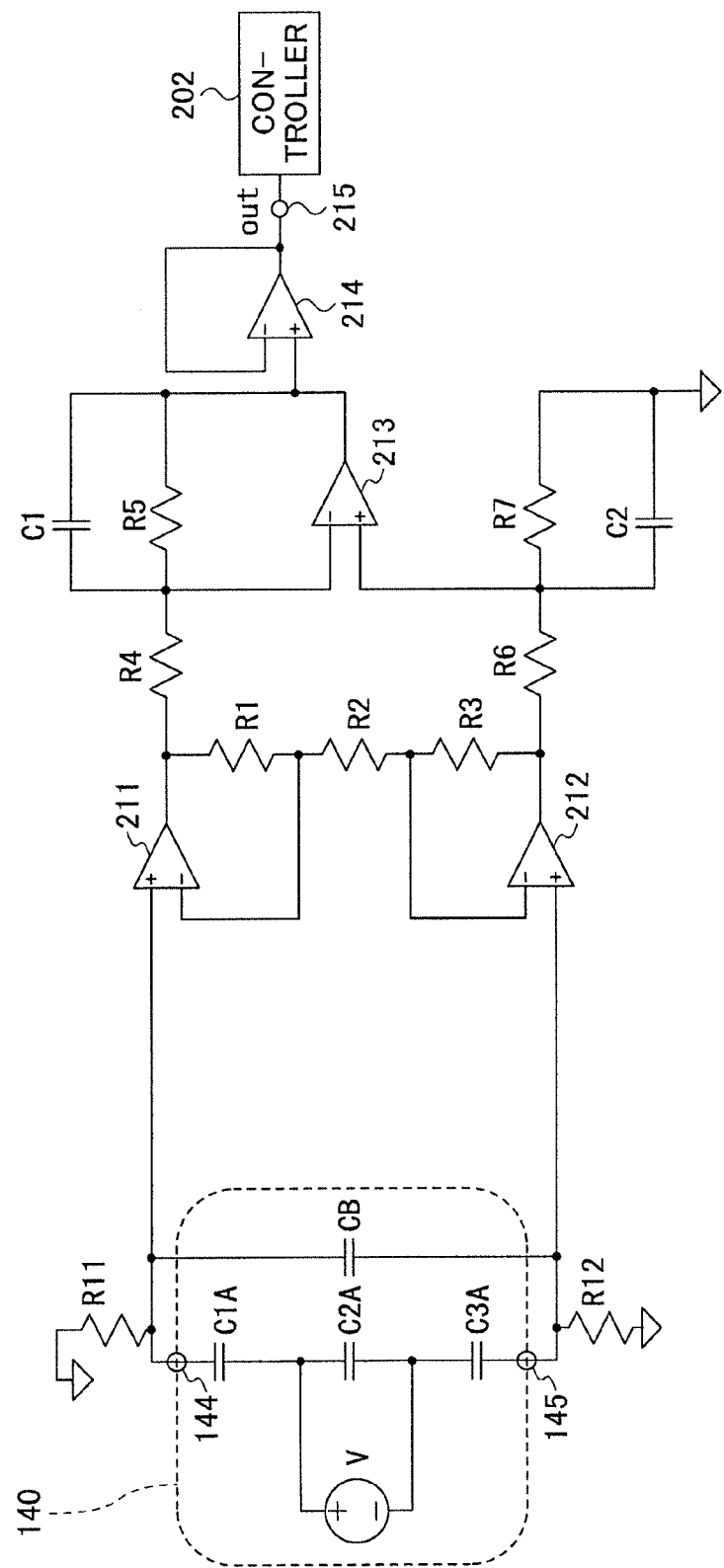
FIG. 10 is a diagram illustrating a circuit inside of a comparative pressure sensor module.

FIG. 10 is a diagram illustrating a circuit inside of a comparative pressure sensor module 20. The comparative pressure sensor module 20 illustrated in FIG. 10 has a configuration where the reset switch 201 and the capacitors C3 and C4 are omitted from the pressure sensor module 200 of the embodiment illustrated in FIG. 7. Because other configurations of the pressure sensor module 20 are similar to those of the pressure sensor module 200, same reference numerals are given to the similar elements and their descriptions are omitted.

Here, because the pressure sensor module 20 does not include the reset switch 201, the controller 202 compares the output voltage of the terminal 215 with the threshold to perform processing (selection confirming processing) for confirming a selected manipulation input.

Figure 11:
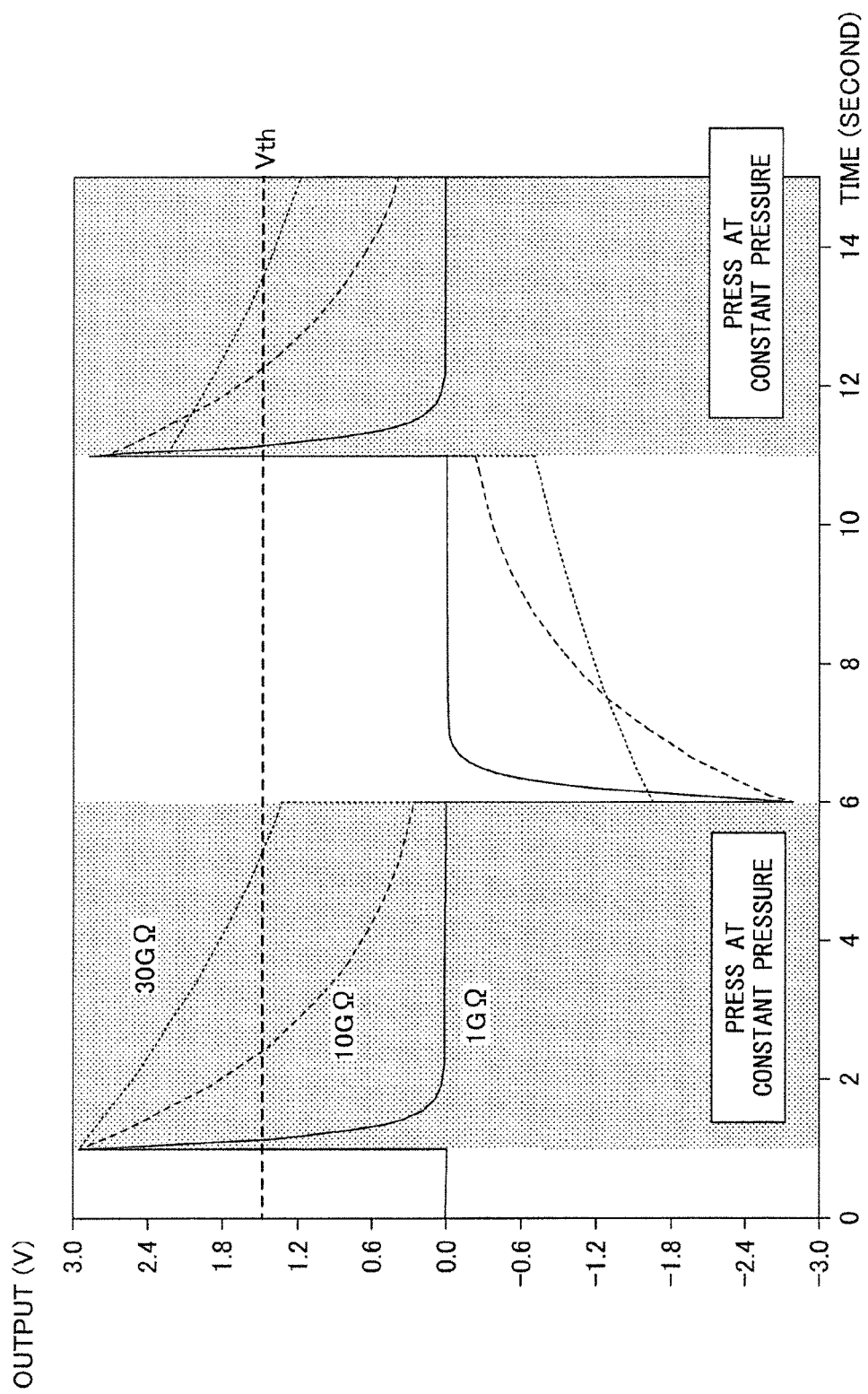
FIG. 11 is a diagram illustrating a simulation result of a voltage output from the terminal of the comparative pressure sensor module.

FIG. 11 is a diagram illustrating a simulation result of the voltage output from the terminal 215 of the pressure sensor module 20. Here, the simulation is performed under three conditions where both of the resistors R11 and R12 as the insulation resistances are 1 GΩ, 10 GΩ, or 30 GΩ.

In FIG. 11, a horizontal axis represents an elapsed time from the start of the simulation. The top panel 120 is pressed at a constant pressure over 5 seconds from a time point, at which the elapsed time is 1 second, to a time point, at which the elapsed time is 6 seconds. Then, the manipulation input on the top panel 120 is stopped at the time point, at which the elapsed time is 6 seconds, and the top panel 120 is again pressed at the constant pressure from a time point at which the elapsed time is 11 seconds.

Further, a vertical axis in FIG. 11 represents a voltage output from the terminal 215 of the pressure sensor module 20. The controller 202 uses a predetermined threshold Vth to detect pressing when the output voltage of the terminal 215 is equal to or greater than the predetermined threshold. Here, the predetermined threshold Vth is set to 1.5 V.

When the top panel 120 is pressed at the constant pressure from the time point, at which the elapsed time is 1 second, the output voltage of the terminal 215 increases. This is because the electromotive force is generated in the pressure-sensitive material layer 143 when the top panel 120 is pressed.

Here, in any case where both of the resistors R11 and R12 are 1 GΩ, 10 GΩ, or 30 GΩ, the output voltage of the terminal 215 increases to about 3.0 V at a moment when the top panel 120 is pressed. The controller 202 detects that the pressing is performed because the voltage is equal to or greater than the predetermined threshold Vth (1.5 V).

When the top panel 120 is pressed at the constant pressure over 5 seconds from the time point, at which the elapsed time is 1 second, to the time point, at which the elapsed time is 6 seconds, the output voltage of the terminal 215 gradually decreases in every case. This is because the leakage current flows into the resistors R11 and R12 as the insulation resistances.

Here, in a case where both of the resistors R11 and R12 are 1 GΩ, the output voltage of the terminal 215 exponentially decreases, and becomes less than the predetermined threshold Vth (1.5 V) at the time point at which the elapsed time is about 1.3 seconds.

Further, in a case where both of the resistors R11 and R12 are 10 GΩ, the output voltage of the terminal 215 becomes less than the predetermined threshold Vth (1.5 V) at the time point at which the elapsed time is about 2.4 seconds.

Further, in a case where both of the resistors R11 and R12 are 30 GΩ, the output voltage of the terminal 215 becomes less than the predetermined threshold Vth (1.5 V) at the time point at which the elapsed time is about 5.2 seconds.

As described above, in any case where both of the resistors R11 and R12 are 1 GΩ, 10 GΩ, or 30 GΩ, the output voltage of the terminal 215 becomes less than the predetermined threshold Vth (1.5 V) before the time point of 6 seconds at which the user stops the pressing.

In particular, the decrease of the output voltage of the terminal 215 is exponential when the resistors R11 and R12 are 1 GΩ or 10 GΩ. In the case of 1 GΩ, it becomes a state where the pressing cannot be detected even when the pressing is performed after the elapsed time of about 1.3 seconds. In the case of 10 GΩ, it becomes a state where the pressing cannot be detected even when the pressing is performed after the elapsed time of about 3.2 seconds.

Further, in a case of 30 GΩ, it becomes a state where the pressing cannot be detected even when the pressing is performed after the elapsed time of about 5.2 seconds.

Then, when the manipulation input and the pressing on the top panel 120 are stopped at the time point at which the elapsed time is 6 seconds, the output voltage of the terminal 215 exponentially decreases.

Here, in the case where both of the resistors R11 and R12 are 1 GΩ or 10 GΩ, the output voltage of the terminal 215 decreases to about −2.8 V at the moment when the manipulation input and the pressing on the top panel 120 are stopped.

Further, in the case where both of the resistors R11 and R12 are 30 GΩ, the output voltage of the terminal 215 decreases to about −1.8 V at the moment when the manipulation input and the pressing on the top panel 120 are stopped.

This is because, when the top panel 120 is pressed over 5 seconds from the time point, at which the elapsed time is 1 second, to the time point, at which the elapsed time is 6 seconds, the leakage current continues to flow to the resistors R1 and R2 and electric charges accumulated in the electrode (electrode 141) at the upper side of the capacitor C1A and the electrode (electrode 142) at the lower side of the capacitor C3A are pulled out.

Further, because a current amount of the leakage current is larger, the output voltage of the terminal 215 in the case of 1 GΩ or 10 GΩ is less than the output voltage of the terminal 215 in the case of 30 GΩ.

After the output voltage of the terminal 215 exponentially decreases at the time point at which the elapsed time is 6 seconds, the output voltage of the terminal 215 returns to 0 V at the time point at which the elapsed time is about 7 seconds in the case of 1 GΩ.

Further, in the case of 10 GΩ or 30 GΩ, although the output voltage of the terminal 215 gradually increases, the output voltage does not return to 0 V at the time point at which the elapsed time is 11 seconds. At the time point at which the elapsed time is 11 seconds, the output voltage is about −0.3 V in the case of 10 GΩ and the output voltage is about −0.8 V in the case of 30 GΩ.

After that, when the top panel 120 is again pressed at the constant pressure from the time point at which the elapsed time is 11 seconds, the output voltage of the terminal 215 increases.

In the case where both of the resistors R11 and R12 are 1 GΩ, the output voltage of the terminal 215 increases to about 2.8 V at the moment when the top panel 120 is pressed.

In the cases where both of the resistors R11 and R12 are 10 GΩ and 30 GΩ, the output voltages of the terminal 215 respectively increase to about 2.6 V and about 2.2 V at the moment when the top panel 120 is pressed.

When the top panel 120 is pressed at the constant pressure from the time point at which the elapsed time is 11 seconds, the output voltage of the terminal 215 gradually decreases due to the influence of the leakage current into the resistors R11 and R12 in both cases.

However, in the case where both of the resistors R11 and R12 are 1 GΩ, the output voltage of the terminal 215 exponentially decreases, and becomes less than the predetermined threshold Vth (1.5 V) at the time point at which the elapsed time is about 11.3 seconds.

Further, in the case where both of the resistors R11 and R12 are 10 GΩ, the output voltage of the terminal 215 becomes less than the predetermined threshold Vth (1.5 V) at the time point at which the elapsed time is about 12.2 seconds.

Further, in the case where both of the resistors R11 and R12 are 30 GΩ, the output voltage of the terminal 215 becomes less than the predetermined threshold Vth (1.5 V) at the time point at which the elapsed time is about 13.5 seconds.

In this way, in any case where both of the resistors R11 and R12 are 1 GΩ, 10 GΩ, or 30 GΩ, the output voltage of the terminal 215 becomes less than the predetermined threshold Vth (1.5 V) while the user performs the pressing.

In particular, the decrease of the output voltage of the terminal 215 is exponential when the resistors R11 and R12 are 1 GΩ or 10 GΩ. In the case of 1 GΩ, it becomes a state where the pressing cannot be detected even when the pressing is performed after the elapsed time of about 11.3 seconds. In the case of 10 GΩ, it becomes a state where the pressing cannot be detected after the elapsed time of about 12.2 seconds.

Further, in a case of 30 GΩ, it becomes a state where the pressing cannot be detected even when the pressing is performed after the elapsed time of about 13.5 seconds.

The above described simulation result means that, in a case where the user performs pressing over a relatively long time equal to or greater than several seconds, although the controller 202 can detect the pressing immediately after the start of the pressing, from then on, the controller 202 cannot detect the pressing.

Accordingly, the comparative pressure sensor module 20 cannot accurately detect the pressing of the top panel 120 by the user.

In a case where the user performs pressing over a relatively long time, the leakage current continues to flow to the resistors R1 and R2 and electric charges accumulated in the electrode (electrode 141) at the upper side of the capacitor C1A and the electrode (electrode 142) at the lower side of the capacitor C3A are pulled out. As a result, because the electric potentials of the electrode (electrode 141) at the upper side of the capacitor C1A and the electrode (electrode 142) at the lower side of the capacitor C3A are held in negative electric potentials until pressing is performed next time, it becomes impossible to accurately detect the pressing in a case where the pressing is performed again.

In contrast, according to the input apparatus 100A (see FIG. 4) of the embodiment including the pressure sensor module 200 illustrated in FIG. 7, when the touch panel 150 detects that the manipulation input is stopped after the top panel 120 is pressed, the controller 202 turns on the reset switch 201 for the predetermined time period and resets the output voltage of the terminal 215 to be 0 V.

Accordingly, the input apparatus 100A of the embodiment can correctly detect the pressing of the top panel 120 even when the pressing is again performed after the manipulation input and the pressing are stopped after top panel 120 is pressed for the relatively long time such as several seconds, for example.

Thus, according to the embodiment, it becomes possible to provide the input apparatus 100A that can accurately detect the pressing by the manipulation input.

Although the embodiment is described above where the pressure sensor module 200 includes the controller 202, and the controller 202 drives the reset switch 201, the CPU 181 may drive the reset switch 201. In this case, the pressure sensor module 200 does not have to include the controller 202.

Further, in the above described embodiment, the reset switch 201 is turned on for the predetermined period when the manipulation input on the touch panel 150 is stopped after the pressing is stopped after the pressing of the top panel 120 is detected by the pressure sensor 140. However, instead of the stop of the manipulation input on the touch panel 150, detection of a non-pressed state detected by the pressure sensor 140 may be a condition for turning on the reset switch 201.

That is, the reset switch 201 may be turned on for the predetermined time period when the non-pressed state is detected by the pressure sensor 140 after the pressing of the top panel 120 is detected by the pressure sensor 140. In the flowchart in FIG. 8, this corresponds to a case where the reset switch 201 is turned on for the predetermined period in a case where it is determined that the output of the pressure sensor 140 is not equal to or greater than the threshold (NO at step S5).

For example, detection of the non-pressed state may be performed by the pressure sensor 140, in a case where the output voltage of the pressure sensor 140 becomes equal to or less than a predetermined voltage corresponding to the non-pressed state, to detect the non-pressed state with the pressure sensor 140. The predetermined voltage may be equal to the predetermined threshold of when the pressure sensor 140 detects the pressing. The predetermined voltage may be a voltage less than the predetermined threshold.

Further, in the above described embodiment, the reset switch 201 is connected between the terminals 144 and 145 of the pressure sensor 140.

Figure 12:
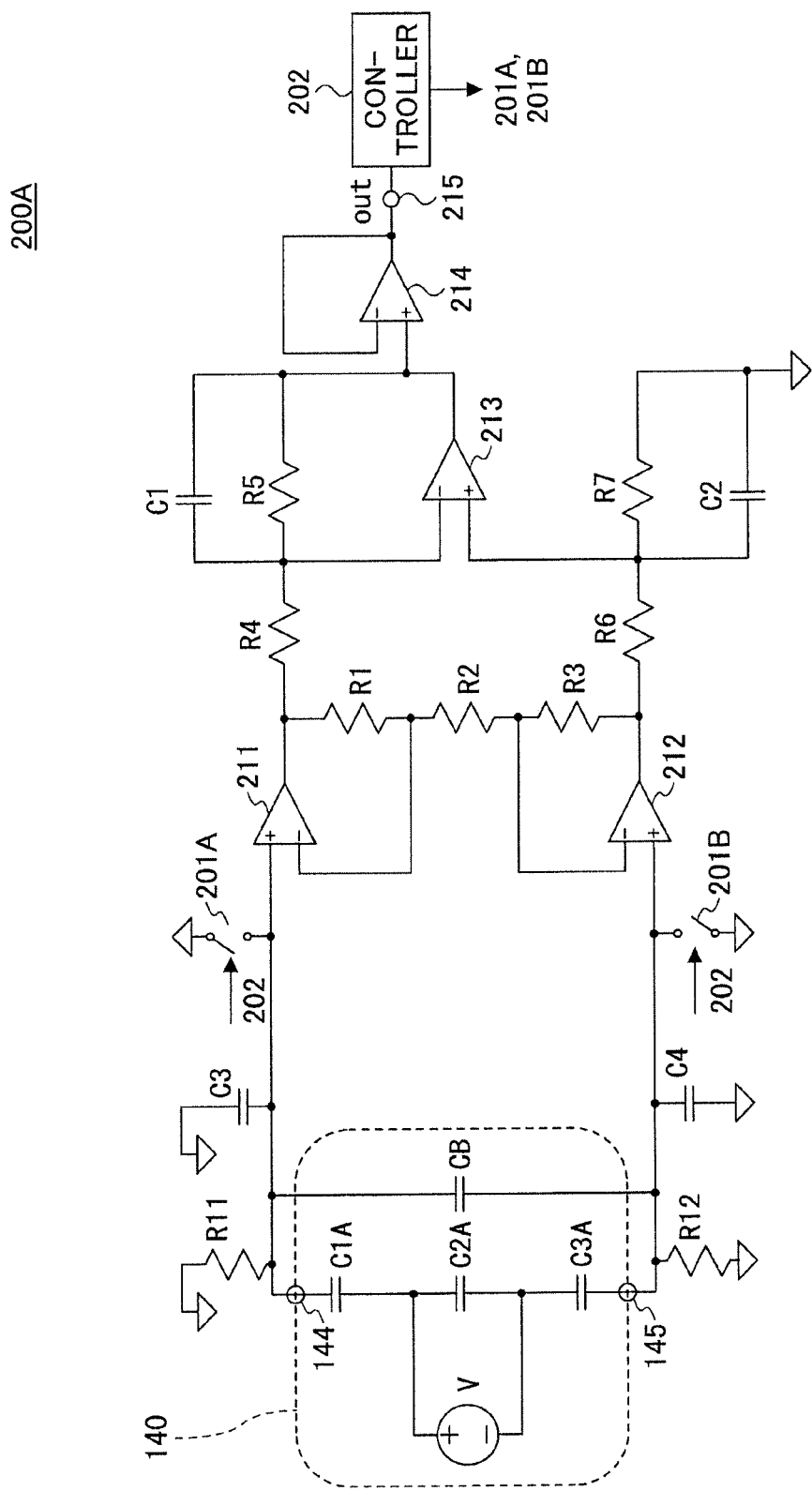
FIG. 12 is a diagram illustrating a circuit inside of a pressure sensor module of an input apparatus according to a variation example of the embodiment.

However, instead of the reset switch 201, reset switches 201A and 202B that respectively connect the terminals 144 and 145 of the pressure sensor 140 to ground potential points may be used as illustrated in FIG. 12.

Further, in the above described embodiment, the pressure sensor 140 is provided between the double-faced adhesive tapes 130A and 130B. However, it is not necessary to provide the pressure sensor 140 between the double-faced adhesive tapes 130A and 130B because it is sufficient for the pressure sensor 140 to detect the pressing by the manipulation input on the top panel 120. For example, a pressure sensor 140 having a rectangular-ring-shape may be provided inside or outside of the double-faced adhesive tapes 130A and 130B in plan view. Further, a plurality of pressure sensors 140 may be provided on four corners or along four sides of the top panel 120 in plan view, for example.

Further, although the capacitors C3 and C4 are respectively connected to the terminals 144 and 145 of the pressure sensor 140 in the above described embodiment, either the capacitor C3 or the capacitor C4 may be connected.

FIG. 12 is a diagram illustrating a circuit inside of a pressure sensor module 200A of an input apparatus according to a variation example of the embodiment.

The pressure sensor module 200A uses the reset switches 201A and 201B instead of the reset switch 201 illustrated in FIG. 7. One ends of the reset switches 201A and 201B are respectively connected to the terminals 144 and 145 of the pressure sensor 140. The other ends are grounded. The reset switch 201A is an example of a first switch. The reset switch 201B is an example of a second switch.

Similar to the case where the reset switch 201 illustrated in FIG. 7 is used, potentials of the terminals 144 and 145 of the pressure sensor 140 become equal at the ground potential when the reset switches 201A and 201B are turned on, even if such reset switches 201A and 201B are used.

In this way, the output voltage of the terminal 215 becomes 0 V and the output voltage of the terminal 215 is reset to be 0 V.

Thus, according to the variation example of the embodiment, it becomes possible to provide the input apparatus that can accurately detect the pressing by the manipulation input.

Although examples of an input apparatus according to the embodiment of the present invention have been described, the present invention is not limited to the embodiment specifically disclosed and various variations and modifications may be made without departing from the scope of the present invention.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the sprit and scope of the invention.

What is claimed is:

1. An input apparatus comprising:
   a top panel having a manipulation input surface on which a manipulation input is performed;
   a pressure sensor having two terminals and configured to output a voltage in accordance with a pressure applied by the manipulation input on the manipulation input surface;
   a switch connected to two terminals of the pressure sensor and configured to equalize electric potentials between the two terminals when the switch is turned on; and
   a controller configured to turn on the switch, after the pressure applied on the manipulation input surface is detected based on an output of the pressure sensor, when the manipulation input on the manipulation input surface is stopped or the output of the pressure sensor becomes equal to or less than a predetermined level that represents non-pressing.

2. The input apparatus according to claim 1, wherein the switch is connected between the two terminals of the pressure sensor.

3. The input apparatus according to claim 1,
   wherein the switch includes a first switch connected between one terminal of the two terminals of the pressure sensor and a reference potential point, and
   wherein the switch includes a second switch connected between the other terminal of the two terminals of the pressure sensor and the reference potential point.

4. The input apparatus according to claim 1, further comprising:
   a first capacitor connected between one terminal of the two terminals of the pressure sensor and a reference potential point.

5. The input apparatus according to claim 1, wherein the controller turns on the switch over a predetermined time period.

6. The input apparatus according to claim 1, wherein the controller is included in a pressure sensor module that includes the pressure sensor and the switch.

7. The input apparatus according to claim 1,
   wherein the controller is included in an arithmetic processing unit provided outside of a pressure sensor module that includes the pressure sensor and the switch.

8. The input apparatus according to claim 4, further comprising:
   a second capacitor connected between the other terminal of the two terminals of the pressure sensor and the reference potential point.

* * * * *